(12) United States Patent
Pu et al.

(10) Patent No.: US 11,573,101 B2
(45) Date of Patent: Feb. 7, 2023

(54) QUASI-ZERO STIFFNESS ABSOLUTE DISPLACEMENT SENSOR BASED ON ELECTROMAGNETIC POSITIVE STIFFNESS

(71) Applicant: CHONGQING UNIVERSITY, Chongqing (CN)

(72) Inventors: Huayan Pu, Chongqing (CN); Yan Jing, Chongqing (CN); Jinglei Zhao, Chongqing (CN); Jun Luo, Chongqing (CN); Yi Qin, Chongqing (CN); Zhijiang Xie, Chongqing (CN); Jie Ma, Chongqing (CN)

(73) Assignee: CHONGQING UNIVERSITY

( * ) Notice: Subject to any disclaimer, the term of this patent is extended or adjusted under 35 U.S.C. 154(b) by 0 days.

(21) Appl. No.: 17/733,147

(22) Filed: Apr. 29, 2022

(65) Prior Publication Data
US 2022/0404172 A1   Dec. 22, 2022

(30) Foreign Application Priority Data
Apr. 6, 2021 (CN) .......................... 202110366622.6

(51) Int. Cl.
*G01D 5/20* (2006.01)
(52) U.S. Cl.
CPC .................... *G01D 5/204* (2013.01)
(58) Field of Classification Search
CPC ...... G01D 5/20; G01D 5/204; G01D 2205/40; G01D 2205/50; G01D 2205/70; G01B 7/003; G01N 27/90; G01N 27/9093
See application file for complete search history.

(56) References Cited

U.S. PATENT DOCUMENTS

2020/0141763 A1 *   5/2020   Pu .......................... G01H 11/02

FOREIGN PATENT DOCUMENTS

CN   102506110 A      6/2012
CN   113588189 A   *  11/2021

OTHER PUBLICATIONS

Jinglei Zhao, et al., "A Novel Electromagnet-based Absolute Displacement Sensor With Approximately Linear Quasi-zero-stiffness", International Journal of Mechanical Sciences 181, 2020, www.elsevier.com/locate/ijmesci.

* cited by examiner

*Primary Examiner* — Son T Le
(74) *Attorney, Agent, or Firm* — Ward Law Office LLC; Jacob M. Ward (57) ABSTRACT

Disclosed is a quasi-zero stiffness absolute displacement sensor based on electromagnetic positive stiffness, and relates to the technical field of vibration measurement. The quasi-zero stiffness absolute displacement sensor comprises an eddy current displacement sensor unit, a negative stiffness unit, an intermediate connector, a positive stiffness unit, a bottom shell and a motion axis. The damping of the mechanism can be effectively reduced, the service life of the system is prolonged, and the mechanism size is reduced. By adjusting the number of layers of permanent magnets and coils in the electromagnetic positive stiffness unit and the electromagnetic negative stiffness unit and controlling the magnitude of current in the coils, electromagnetic force between the permanent magnets and the electromagnetic coils can be changed, the magnitude of positive stiffness and the magnitude of negative stiffness are adjusted, and control over the stiffness of the whole system is achieved.

6 Claims, 11 Drawing Sheets

QUASI-ZERO STIFFNESS ABSOLUTE DISPLACEMENT SENSOR BASED ON ELECTROMAGNETIC POSITIVE STIFFNESS

CROSS REFERENCE TO RELATED APPLICATION

This patent application claims the benefit and priority of Chinese Patent Application No. 202110366622.6, filed on Apr. 6, 2021, the disclosure of which is incorporated by reference herein in its entirety as part of the present application.

TECHNICAL FIELD

The present disclosure relate to the technical field of vibration measurement, in particular to a quasi-zero stiffness absolute displacement sensor based on electromagnetic positive stiffness.

BACKGROUND ART

In engineering practice, measurement of system displacement plays a key role in control and vibration isolation of the system. Along with continuous improvement of intelligence and automation degrees of various fields, requirements of various industrial fields for displacement sensors are also continuously improved. However, a measurement object always does not have an absolutely static reference point, and the absolute displacement of the system cannot be directly measured. Indirect measurement often causes errors and time delay, and some system control which is high in precision requirement and short in time response cannot achieve a good control effect because absolute displacement of the system cannot be directly measured. Although some existing advanced measurement technologies can be applied to absolute displacement measurement (such as inertial sensor, radar or laser technologies), the measurement technologies have the problems of low precision, poor real-time performance, high cost and the like, and cannot be applied to occasions with severe working conditions. The traditional quasi-zero stiffness absolute displacement sensor based on electromagnetism uses a mechanical spring as a positive stiffness mechanism, the damping cannot be ignored at ultralow frequency, and the measurement accuracy is affected. The present disclosure relates to a quasi-zero stiffness absolute displacement sensor based on electromagnetic positive stiffness.

SUMMARY

In order to solve the technical problem, the present disclosure provides a quasi-zero stiffness absolute displacement sensor based on electromagnetic positive stiffness. A positive stiffness mechanism and a negative stiffness mechanism of the sensor are both of an electromagnetic type, and the magnitude of electromagnetic positive stiffness and the magnitude of electromagnetic negative stiffness are adjusted by changing the geometric parameters of coils and permanent magnets and the magnitude of coil current, so that the overall rigidity of the system is reduced.

In order to achieve the purpose, the present disclosure provides the following scheme:

The present disclosure provides a quasi-zero stiffness absolute displacement sensor based on electromagnetic positive stiffness, comprising an eddy current displacement sensor unit, a negative stiffness unit, an intermediate connector, a positive stiffness unit and a bottom shell which are sequentially connected from top to bottom, and further comprising a motion axis penetrating through the negative stiffness unit, the intermediate connector and the positive stiffness unit, wherein the top end of the motion axis extends into the eddy current displacement sensor unit to be connected with the interior of the eddy current displacement sensor unit.

Optionally, the eddy current displacement sensor unit comprises a top shell, an eddy current sensor and a mass block; the bottom of the top shell is open, and the bottom of the top shell is connected with the negative stiffness unit; a through hole is formed in the top of the top shell, and the eddy current sensor is arranged in the top shell and penetrates through the through hole; and the mass block is arranged in the top shell and is connected with the top of the motion axis.

Optionally, the negative stiffness unit comprises a first stop ring, a first permanent magnet, a second permanent magnet, a second stop ring, a first linear bearing, a first shell, a first electromagnetic coil, a second electromagnetic coil and a second cushion block;

the top of the first shell is connected with the bottom of the eddy current displacement sensor unit, and the bottom of the first shell is connected with the top of the intermediate connector;

a first mounting plate is arranged in the first shell, the periphery of the first mounting plate is connected with the first shell, and the first linear bearing is arranged in the middle of the first mounting plate;

the motion axis penetrates through the first linear bearing;

the first stop ring and the second stop ring are sequentially arranged on the side, facing the intermediate connector, of the first mounting plate and located on the motion axis from top to bottom; the first permanent magnet and the second permanent magnet are arranged between the first stop ring and the second stop ring;

the first electromagnetic coil and the second electromagnetic coil are sequentially and fixedly arranged between the first mounting plate and the intermediate connector in the first shell from top to bottom; and the second cushion block is arranged between the second electromagnetic coil and the intermediate connector.

Optionally, the magnetic pole directions of the first permanent magnet and the second permanent magnet are opposite.

Optionally, the first cushion block is arranged between the first electromagnetic coil and the second electromagnetic coil.

Optionally, the intermediate connector is of an annular structure, an interlayer is arranged in the middle of the intermediate connector, a through hole is formed in the middle of the interlayer, and the motion axis penetrates through the through hole.

Optionally, the positive stiffness unit comprises a third stop ring, a third permanent magnet, a fourth permanent magnet, a fourth stop ring, a second shell, a third cushion block, a third electromagnetic coil, a fourth electromagnetic coil and a second linear bearing;

the top of the second shell is connected with the bottom of the intermediate connector, and the bottom of the second shell is connected with the bottom shell;

a second mounting plate is arranged in the second shell, the periphery of the second mounting plate is connected with the second shell, and the second linear bearing is arranged in the middle of the second mounting plate;

the motion axis penetrates through the second linear bearing;

the fourth stop ring and the third stop ring are sequentially arranged on the side, facing the intermediate connector, of the second mounting plate and located on the motion axis from top to bottom; the fourth permanent magnet and the third permanent magnet are arranged between the fourth stop ring and the third stop ring;

the fourth electromagnetic coil and the third electromagnetic coil are sequentially and fixedly arranged between the second mounting plate and the intermediate connector in the second shell from top to bottom; and the third cushion block is arranged between the third electromagnetic coil and the intermediate connector.

Optionally, the magnetic pole directions of the fourth permanent magnet and the third permanent magnet are opposite.

Optionally, the fourth cushion block is arranged between the fourth electromagnetic coil and the third electromagnetic coil.

Compared with the prior art, the present disclosure has the following technical effects.

Firstly, the electromagnetic positive stiffness mechanism is used for replacing a mechanical spring, the contact mode is a non-contact mode, the damping of the mechanism can be effectively reduced, the service life of the system is prolonged, and the size of the mechanism can be effectively reduced.

Secondly, by adjusting the number of layers of permanent magnets and coils in the electromagnetic positive stiffness unit and the electromagnetic negative stiffness unit and controlling the magnitude of current in the coils, electromagnetic force between the permanent magnets and the electromagnetic coils can be changed, the magnitude of positive stiffness and the magnitude of negative stiffness are adjusted, and control over the stiffness of the whole system is achieved.

Thirdly, the positive stiffness and the negative stiffness are approximately linear within a certain range, the influence of nonlinearity can be eliminated, after the positive stiffness and the negative stiffness are superposed, comprehensive stiffness of the system can be reduced to the maximum extent, quasi-zero stiffness is achieved, and high measurement precision is obtained.

Fourthly, the initial position and the motion range of the permanent magnets are selected, so that the system can reach a quasi-zero stiffness state under the condition of certain bearing capacity.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs in the attached figures: 1, eddy current displacement sensor unit; 2, negative stiffness unit; 3, intermediate connector; 4, positive stiffness unit; 5, bottom shell; 6, motion axis;

101, stop shell; 102, eddy current sensor; 103, mass block;

201, first stop ring; 202, first permanent magnet; 203, second permanent magnet; 204, second stop ring; 205, first linear bearing; 206, first shell; 207, first electromagnetic coil; 208, first cushion block; 209, second electromagnetic coil; 210, second cushion block;

401, third stop ring; 402, third permanent magnet; 403, fourth permanent magnet; 404, fourth stop ring; 405, second shell; 406, third cushion block; 407, third electromagnetic coil; 408, fourth cushion block; 409, fourth electromagnetic coil; and 410, second linear bearing.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

As shown in FIG. 1 to FIG. 12, the embodiment provides a quasi-zero stiffness absolute displacement sensor based on electromagnetic positive stiffness, comprising an eddy current displacement sensor unit, a negative stiffness unit, an intermediate connector, a positive stiffness unit and a bottom shell which are sequentially connected from top to bottom, and further comprising a motion axis penetrating through the negative stiffness unit, the intermediate connector and the positive stiffness unit, wherein the top end of the motion axis extends into the eddy current displacement sensor unit to be connected with the interior of the eddy current displacement sensor unit.

Figure 1:
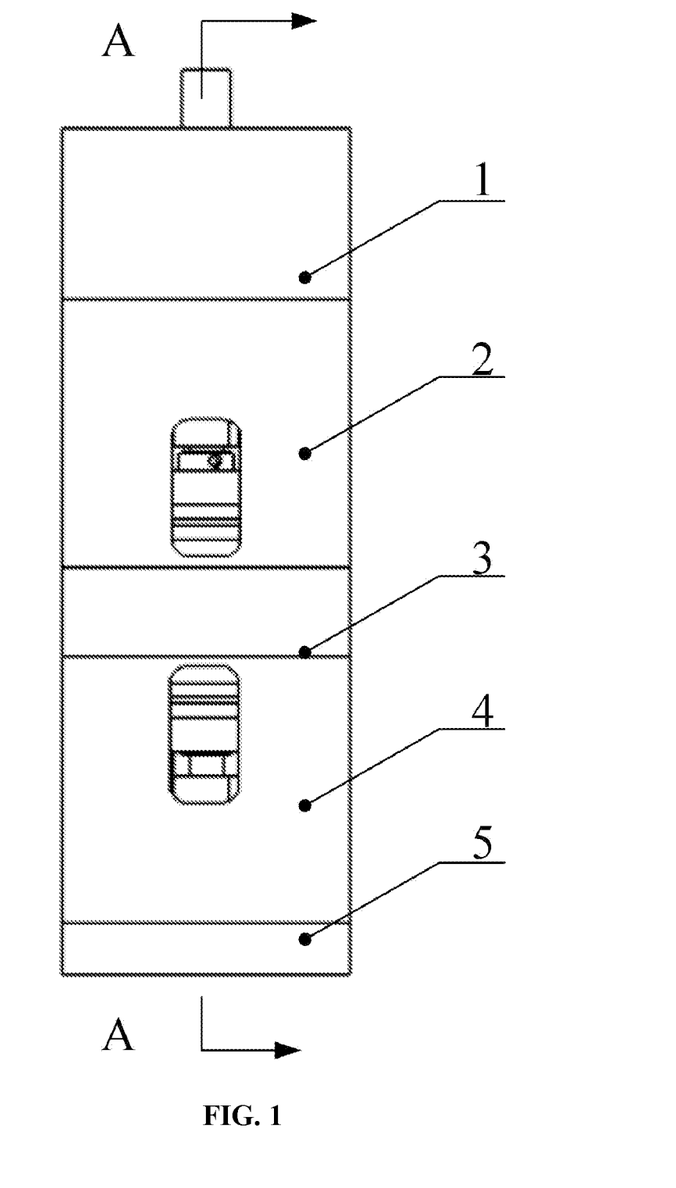
FIG. 1 is a front schematic diagram of a quasi-zero stiffness absolute displacement sensor based on electromagnetic positive stiffness in the present disclosure.
Figure 2:
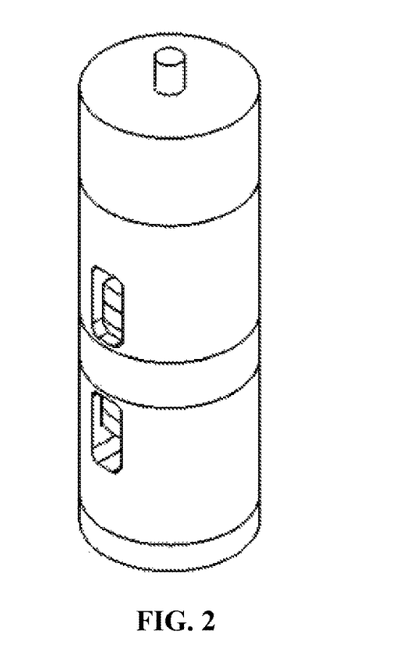
FIG. 2 is an axonometric schematic diagram of a quasi-zero stiffness absolute displacement sensor based on electromagnetic positive stiffness in the present disclosure.
Figure 3:
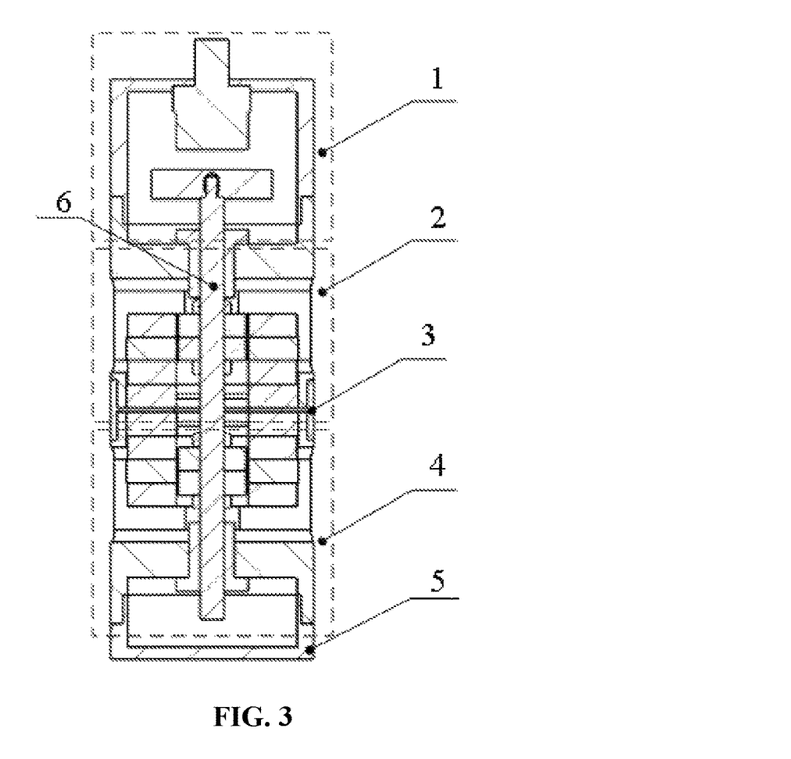
FIG. 3 is a section structural schematic diagram of a quasi-zero stiffness absolute displacement sensor based on electromagnetic positive stiffness in the present disclosure.
Figure 4:
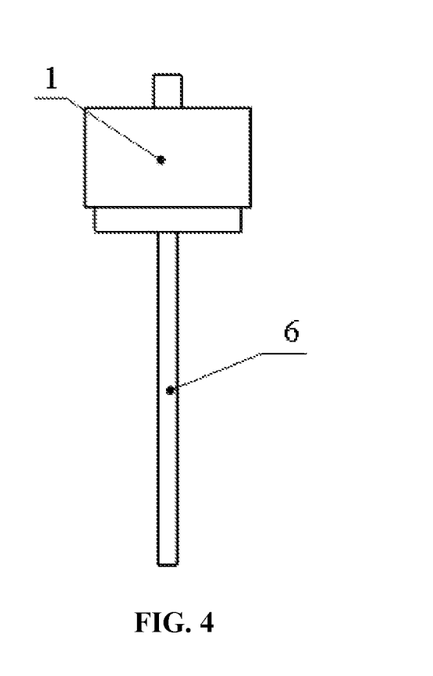
FIG. 4 is a schematic diagram of an eddy current displacement sensor unit in a quasi-zero stiffness absolute displacement sensor based on electromagnetic positive stiffness in the present disclosure.

In the specific embodiment, a mass block 103 in the eddy current displacement sensor unit 1 is in threaded connection with a motion axis 6, a first shell 206 in the negative stiffness unit 2 and a second shell 405 in the positive stiffness unit 4 are respectively in threaded connection with the intermediate connector 3, and the bottom shell 5 is in threaded connection with the first shell 206 in the negative stiffness unit 2.

Figure 5:
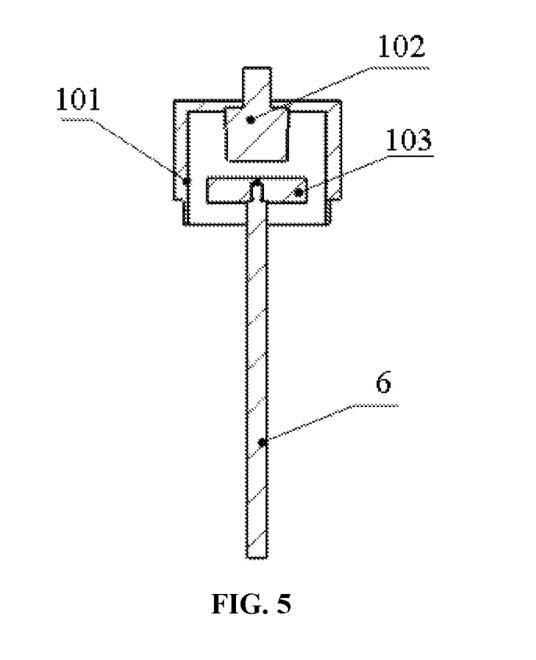
FIG. 5 is a section schematic diagram of an eddy current displacement sensor unit in a quasi-zero stiffness absolute displacement sensor based on electromagnetic positive stiffness in the present disclosure.
Figure 6:
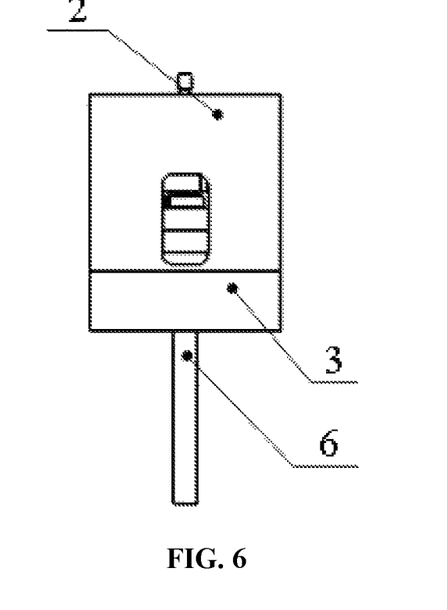
FIG. 6 is a schematic diagram of a negative stiffness unit in a quasi-zero stiffness absolute displacement sensor based on electromagnetic positive stiffness in the present disclosure.

In the embodiment, as shown in FIG. 5, the eddy current displacement sensor unit comprises a top shell 101, an eddy current sensor 102 and a mass block 103. Wherein the top shell 101 is in threaded connection with the first shell 206 in the negative stiffness unit 2, the eddy current sensor 102 is in threaded connection with the top shell 101, and the mass block 103 is in threaded connection with the motion axis 6.

Figure 7:
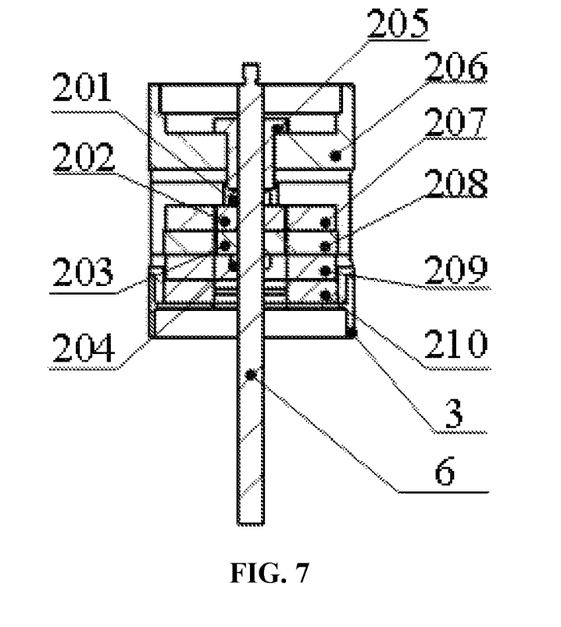
FIG. 7 is a section schematic diagram of a negative stiffness unit in a quasi-zero stiffness absolute displacement sensor based on electromagnetic positive stiffness in the present disclosure.
Figure 8:
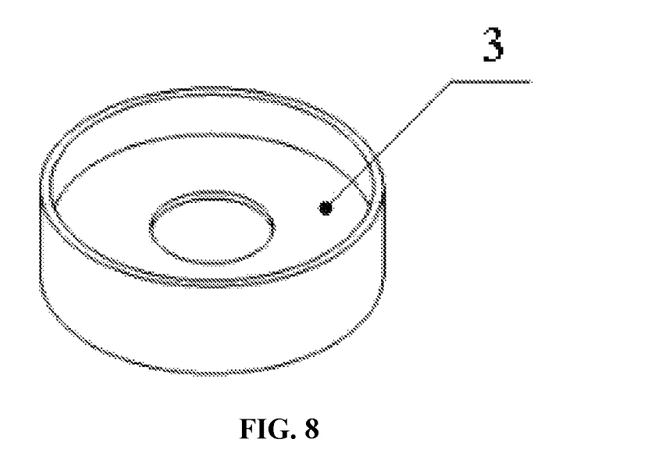
FIG. 8 is a schematic diagram of an intermediate connector in a quasi-zero stiffness absolute displacement sensor based on electromagnetic positive stiffness in the present disclosure.

In the embodiment, as shown in FIG. 7, the negative stiffness unit 2 comprises a first stop ring 201, a first permanent magnet 202, a second permanent magnet 203, a second stop ring 204, a first linear bearing 205, a first shell 206, a first electromagnetic coil 207, a first cushion block 208, a second electromagnetic coil 209 and a second cushion block 210. Wherein the first linear bearing 205 is connected with the first shell 206 through a bolt; the first permanent magnet 202 and the second permanent magnet 203 are fixed on the motion axis 6 through the first stop ring 201 and the second stop ring 204, the magnetization directions of the first permanent magnet 202 and the second permanent magnet 203 are opposite, opposite magnetic poles are oppositely mounted, and the first permanent magnet 202 and the second permanent magnet 203 do not slide relative to the motion axis 6; the first electromagnetic coil 207 and the second electromagnetic coil 209 are fixed to the inner wall of the first shell 206 and do not slide relative to each other, a fixed gap is formed between the first electromagnetic coil 207 and the second electromagnetic coil 209, the gap is equal to the axial thickness of the first cushion block 208, and the first cushion block 208 is used for axial limitation and fixation of the first electromagnetic coil 207 and the second electromagnetic coil 209; the second cushion block 210 is mounted between the second electromagnetic coil 209 and the intermediate connector 3 so that the axial limitation and fixation of the second electromagnetic coil 209 are facilitated, the axial thickness of the second cushion block 210 can be designed according to actual needs, and all the cushion blocks in the embodiment are consistent in structural size. In order to facilitate observation of the mounting of the first electromagnetic coil 207 and the second electromagnetic coil 209 in place, a slot is machined in the first shell 206. When in use, the first electromagnetic coil 207 and the second electromagnetic coil 209 are connected with an external power supply, and currents in the first electromagnetic coil 207 and the second electromagnetic coil 209 are equal in magnitudes and opposite in directions. The inner diameters of the first electromagnetic coil 207 and the second electromagnetic coil 209 are slightly larger than the outer diameters of the first permanent magnet 202 and the second permanent magnet 203, so that when the first permanent magnet 202 and the second permanent magnet 203 drive the motion axis 6 to move up and down, motion interference does not occur between the first electromagnetic coil 207 and the second electromagnetic coil 209 and the first permanent magnet 202 and the second permanent magnet 203.

Figure 9:
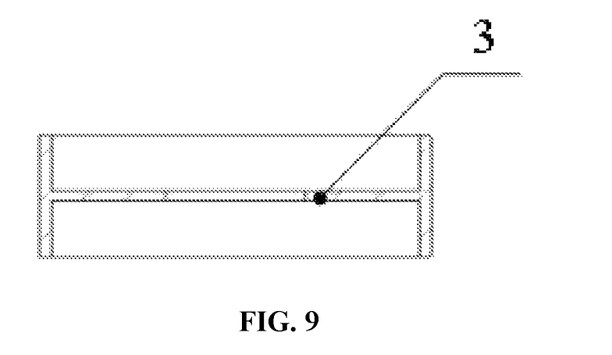
FIG. 9 is a section schematic diagram of an intermediate connector in a quasi-zero stiffness absolute displacement sensor based on electromagnetic positive stiffness in the present disclosure.
Figure 10:
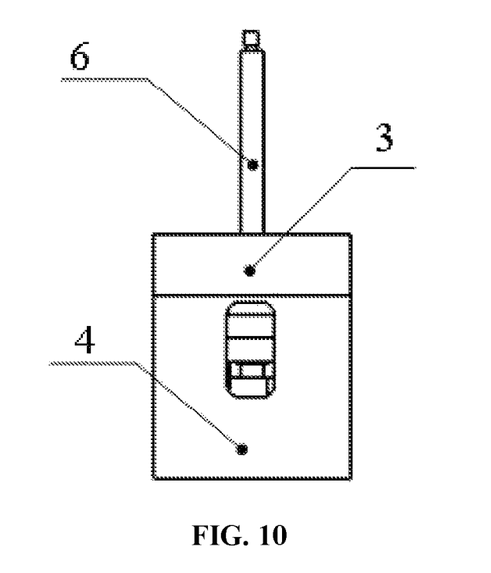
FIG. 10 is a schematic diagram of a positive stiffness unit in a quasi-zero stiffness absolute displacement sensor based on electromagnetic positive stiffness in the present disclosure.

In the embodiment, as shown in FIG. 9, the intermediate connector 3 is in threaded connection with the second shell 405 in the positive stiffness unit 4, and the second cushion block 210 and the third cushion block 406 are respectively in contact with the intermediate connector 3 for axial fixation.

Figure 11:
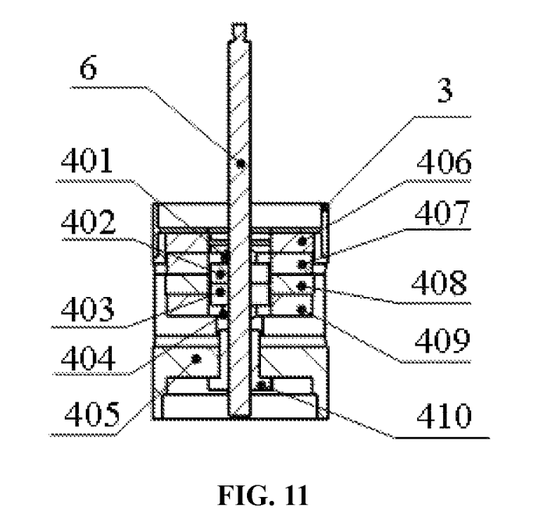
FIG. 11 is a section schematic diagram of a positive stiffness unit in a quasi-zero stiffness absolute displacement sensor based on electromagnetic positive stiffness in the present disclosure.

In the embodiment, as shown in FIG. 11, the positive stiffness unit 4 comprises a third step ring 401, a fourth stop ring 404, a third permanent magnet 402, a fourth permanent magnet 403, a second linear bearing 410, a second shell 405, a third electromagnetic coil 407, a fourth electromagnetic coil 409, a third cushion block 406 and a fourth cushion block 408. Wherein the second linear bearing 410 is connected with the second shell 405 through a bolt; the third permanent magnet 402 and the fourth permanent magnet 403 are fixed on the motion axis 6 through the third stop ring 401 and the fourth stop ring 404, the magnetization directions of the third permanent magnet 402 and the fourth permanent magnet 403 are opposite, opposite magnetic poles are oppositely mounted, and the third permanent magnet 402 and the fourth permanent magnet 403 do not slide relative to the motion axis 6; the third electromagnetic coil 407 and the fourth electromagnetic coil 409 are fixed to the inner wall of the second shell 405 and do not slide relative to each other, a fixed gap is formed between the third electromagnetic coil 407 and the fourth electromagnetic coil 409, the gap is equal to the axial thickness of the fourth cushion block 408, and the fourth cushion block 408 is used for axial limitation and fixation of the third electromagnetic coil 407 and the fourth electromagnetic coil 409; the third cushion block 406 is mounted between the third electromagnetic coil 407 and the intermediate connector 3 so that the axial limitation and fixation of the third electromagnetic coil 407 are facilitated, the axial thickness of the third cushion block 406 can be designed according to actual needs. In order to facilitate observation of the mounting of the third electromagnetic coil 407 and the fourth electromagnetic coil 409 in place, a slot is machined in the second shell 405. The second shell 405 in the positive stiffness unit 4 and the first shell 206 in the negative stiffness unit 2 are structurally identical and symmetrically mounted. When in use, the third electromagnetic coil 407 and the fourth electromagnetic coil 409 are connected with an external power supply, and currents in the third electromagnetic coil 407 and the fourth electromagnetic coil 409 are equal in magnitudes and opposite in directions. The inner diameters of the third electromagnetic coil 407 and the fourth electromagnetic coil 409 are slightly larger than the outer diameters of the third permanent magnet 402 and the fourth permanent magnet 403, so that when the third permanent magnet 407 and the fourth permanent magnet 409 drive the motion axis 6 to move up and down, motion interference does not occur between the third electromagnetic coil 407 and the fourth electromagnetic coil 409 and the third permanent magnet 402 and the fourth permanent magnet 403.

Figure 12:
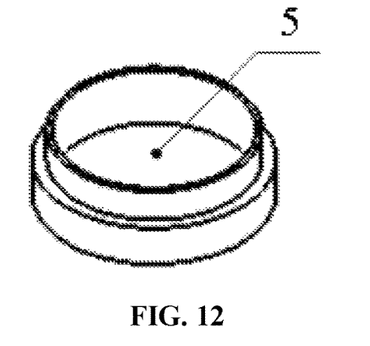
FIG. 12 is a schematic diagram of a bottom shell in a quasi-zero stiffness absolute displacement sensor based on electromagnetic positive stiffness in the present disclosure.
Figure 13:
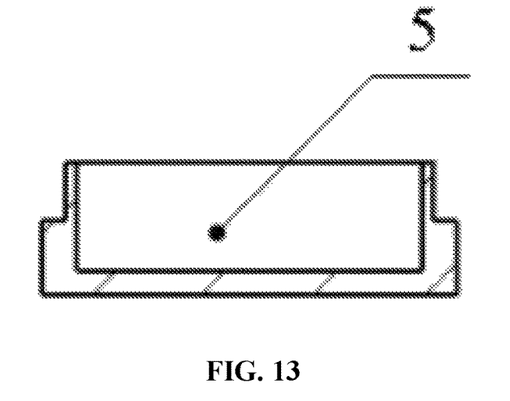
FIG. 13 is a section schematic diagram of a bottom shell in a quasi-zero stiffness absolute displacement sensor based on electromagnetic positive stiffness in the present disclosure.
Figure 14:
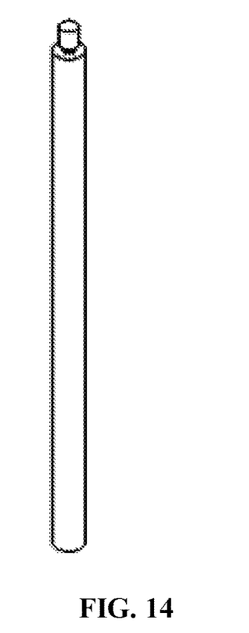
FIG. 14 is a schematic diagram of a motion axis in a quasi-zero stiffness absolute displacement sensor based on electromagnetic positive stiffness in the present disclosure.
Figure 15:
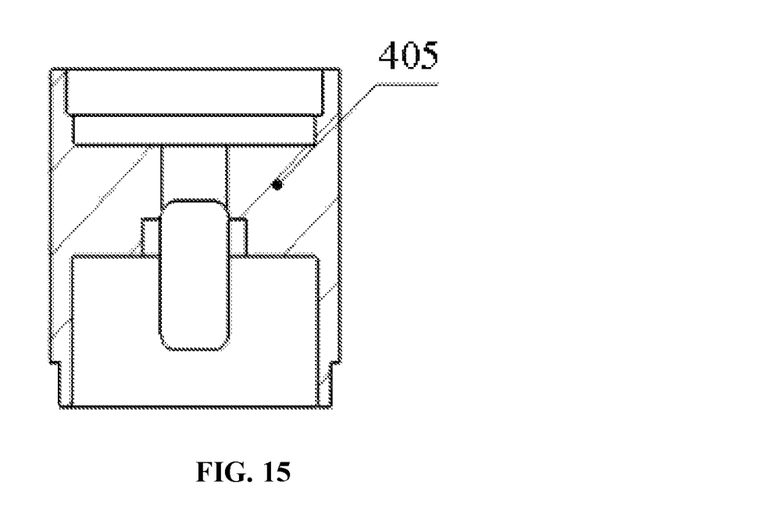
FIG. 15 is a section schematic diagram of a negative stiffness unit shell in a quasi-zero stiffness absolute displacement sensor based on electromagnetic positive stiffness in the present disclosure.
Figure 16:
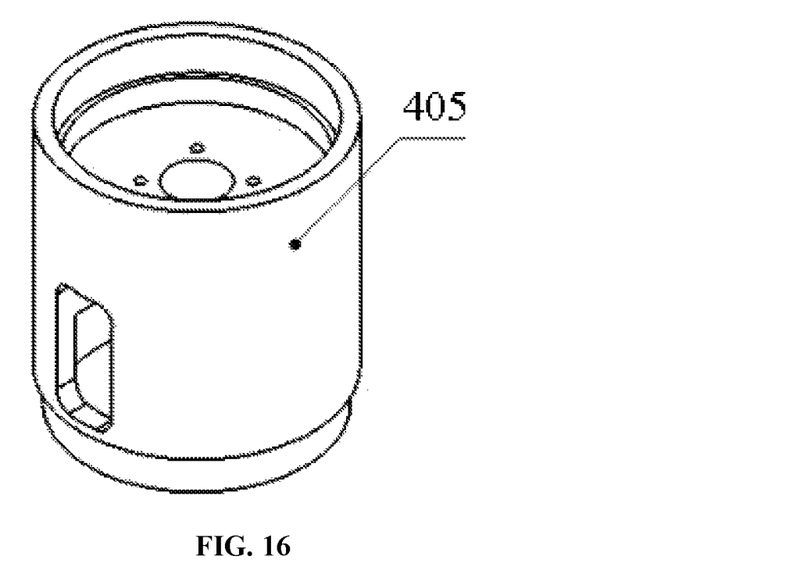
FIG. 16 is a schematic diagram of a negative stiffness unit shell in a quasi-zero stiffness absolute displacement sensor based on electromagnetic positive stiffness in the present disclosure.
Figure 17:
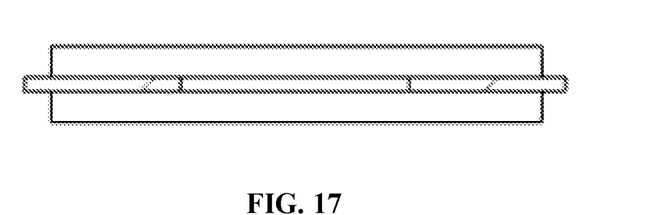
FIG. 17 is a section schematic diagram of a cushion block in a quasi-zero stiffness absolute displacement sensor based on electromagnetic positive stiffness in the present disclosure.
Figure 18:
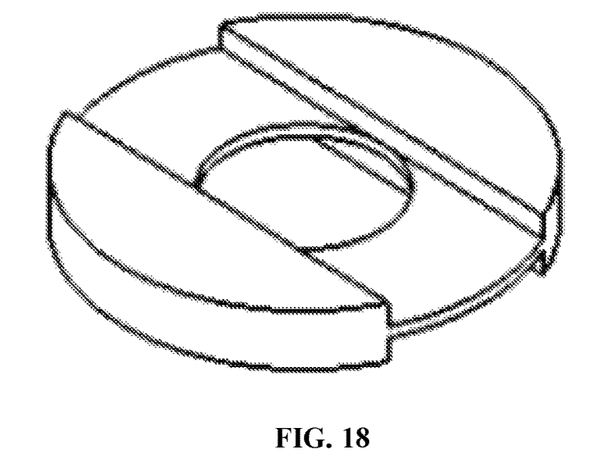
FIG. 18 is a schematic diagram of a cushion block in a quasi-zero stiffness absolute displacement sensor based on electromagnetic positive stiffness in the present disclosure.

In the embodiment, the bottom shell 5 is in threaded connection with the second shell 405 in the positive stiffness unit 4. The motion axis 6 is in threaded connection with the mass block 103, and the permanent magnets are fixed to the motion axis 6 through the stop rings.

In the embodiment, the second electromagnetic coil 209 in the negative stiffness unit 2 and the third electromagnetic coil 407 in the positive stiffness unit 4 are the same in current magnitude and opposite in directions. By adjusting the geometric parameters of the electromagnetic coils and the permanent magnets, the gaps between the coils and the gaps between the permanent magnets, the positive stiffness and the negative stiffness generated by the electromagnetic mechanism can be approximately linear within a certain range, and the system stiffness can be close to 0 to the maximum extent through mutual superposition of the positive stiffness and the negative stiffness.

Figure 19:
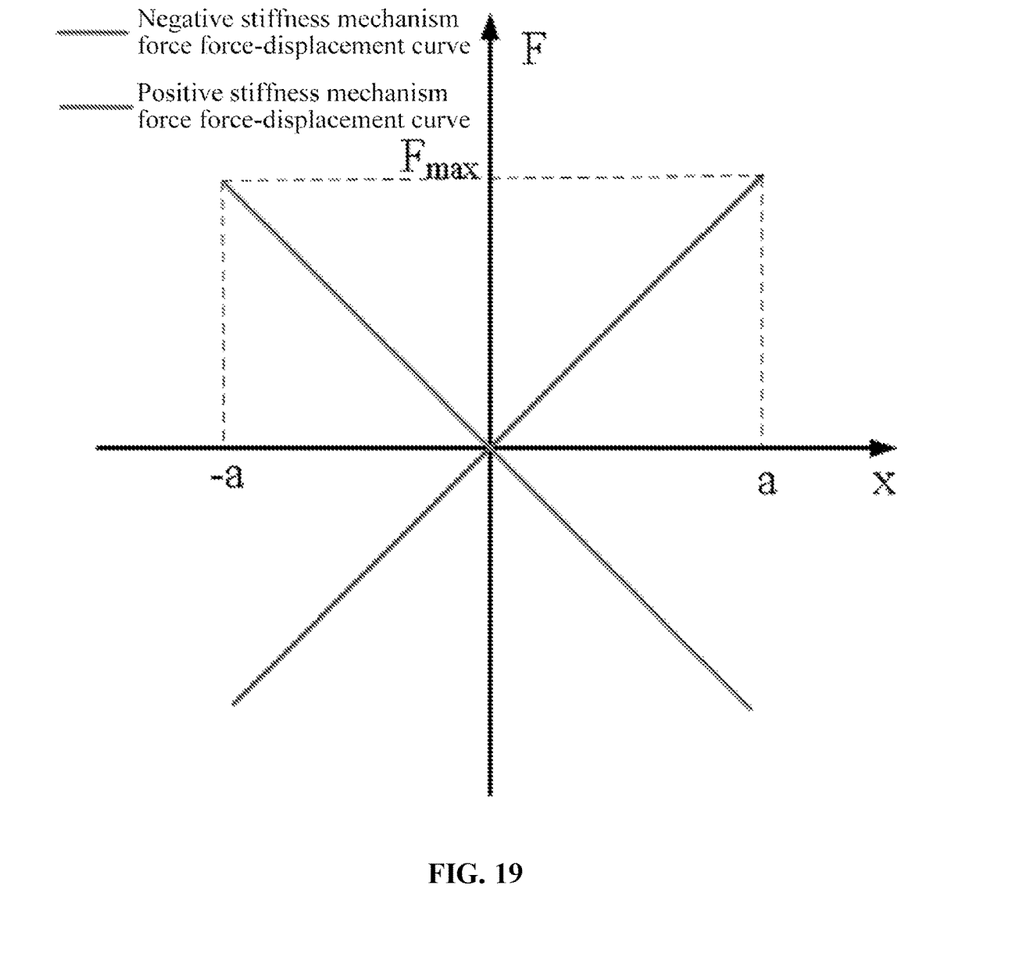
FIG. 19 is a schematic diagram of force-displacement curves in positive and negative stiffness units in a quasi-zero stiffness absolute displacement sensor based on electromagnetic positive stiffness in the present disclosure.

In order to enable the system to generate a constant force to bear the weight of the motion axis 6, the mass block 103 and the permanent magnets in the motion process, the arrangement and the motion range of the permanent magnets need to be reasonably selected. Because the negative stiffness unit 2 and the positive stiffness unit 4 are of symmetrical structures, the calculated force-displacement curves are symmetrical about the original point, as shown in FIG. 19, the upward range of the force taking direction perpendicular to the ground serves as the motion range of the permanent magnet. In the embodiment, the motion range of the permanent magnet in the negative stiffness unit 2 ranges from 0 to a, and the motion range of the permanent magnet in the positive stiffness unit is 0 to −a. When the system generates the maximum constant force Fmax, the initial position of the negative stiffness unit 2 can be set to be (a, 0) and the initial position of the positive stiffness unit 4 can be set to be (0, 0), or the initial position of the negative stiffness unit 2 can be set to be (0, 0) and the initial position of the positive stiffness unit 4 can be set to be (−a, 0). The constant upward force perpendicular to the ground can be obtained through superposition of the two original positions. The magnitude of the force can be adjusted by changing the magnitude of the current.

Figure 20:
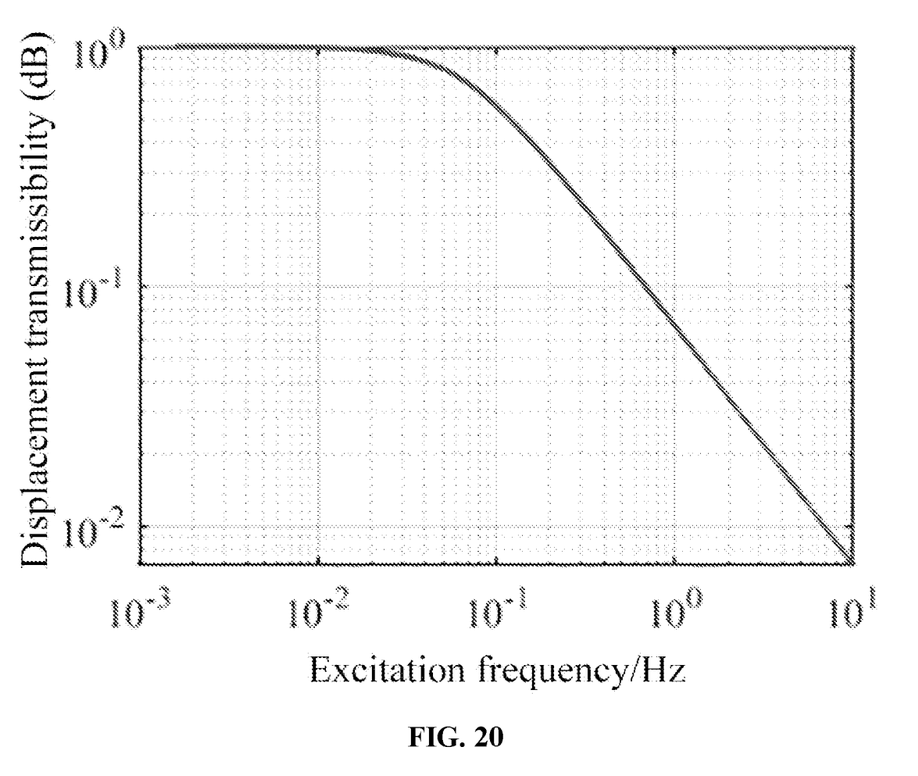
FIG. 20 is a curve chart of the system transmissibility of a quasi-zero stiffness absolute displacement sensor based on electromagnetic positive stiffness in the present disclosure.
Figure 21:
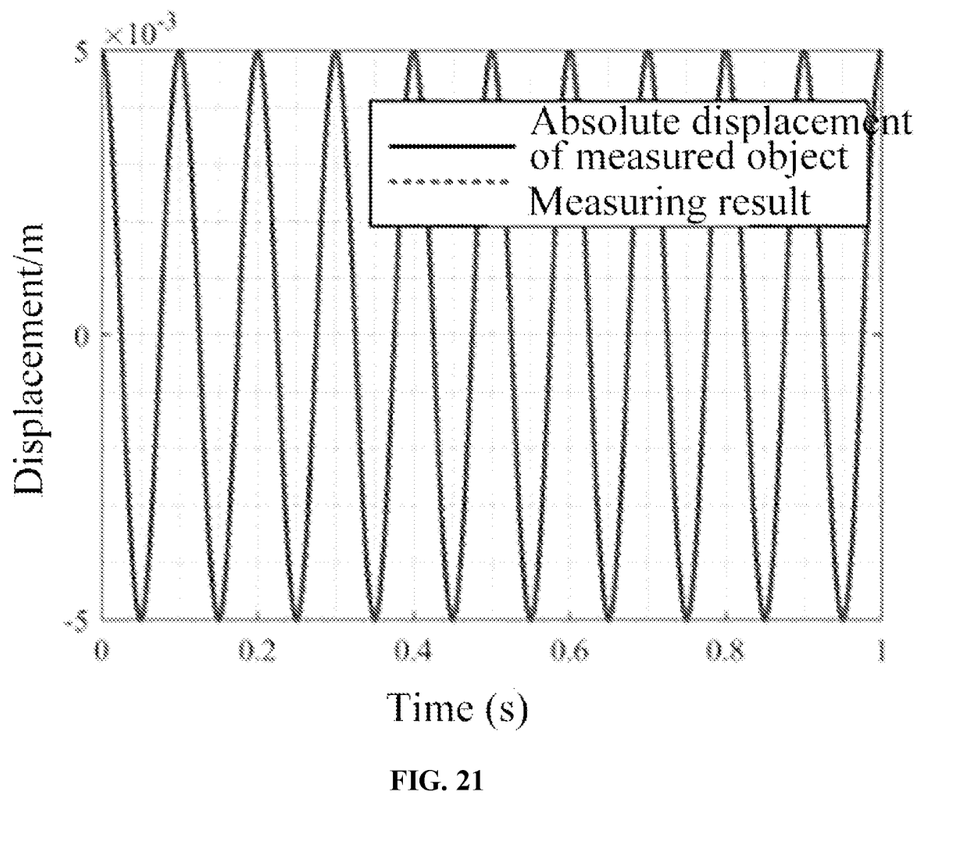
FIG. 21 is a measurement effect diagram of a quasi-zero stiffness absolute displacement sensor based on electromagnetic positive stiffness in the present disclosure.

In the embodiment, when the system works, the bottom shell 5 is connected with a to-be-measured object or a to-be-measured plane, the positive stiffness unit 4 is firstly opened, and the system generates upward force perpendicular to the ground to counteract the gravity of the system. When external excitation is input, vibration or disturbance is transmitted into the system through the bottom shell 5, so that the permanent magnets and the coils move relatively. At the moment, the negative stiffness unit 2 also generates electromagnetic force to act on the axis, resultant force generated by the positive stiffness unit and the negative stiffness unit bears the gravity of the system. Because the comprehensive stiffness of the system is near zero and the damping is small, vibration is rapidly attenuated, so that the mass block becomes an absolute zero point, and accurate measurement of absolute displacement of the to-be-measured object is completed. Therefore, the vibration isolation performance of the system can reflect the measurement performance of the system. For example, FIG. 20 is a transmissibility curve of the system, and FIG. 21 is a comparison diagram of the measuring results of the system and the vibration curve of the measured object.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A quasi-zero stiffness absolute displacement sensor based on electromagnetic positive stiffness, comprising an eddy current displacement sensor unit, a negative stiffness unit, an intermediate connector, a positive stiffness unit and a bottom shell which are sequentially connected from top to bottom, and further comprising a motion axis penetrating through the negative stiffness unit, the intermediate connector and the positive stiffness unit, wherein the top end of the motion axis extends into the eddy current displacement sensor unit to be connected with the interior of the eddy current displacement sensor unit;

the eddy current displacement sensor unit comprises a top shell, an eddy current sensor and a mass block; the bottom of the top shell is open, and the bottom of the top shell is connected with the negative stiffness unit;

a through hole is formed in the top of the top shell, and the eddy current sensor is arranged in the top shell and penetrates through the through hole; and the mass block is arranged in the top shell and is connected with the top of the motion axis;

the negative stiffness unit comprises a first stop ring, a first permanent magnet, a second permanent magnet, a second stop ring, a first linear bearing, a first shell, a first electromagnetic coil, a second electromagnetic coil and a second cushion block;

the top of the first shell is connected with the bottom of the eddy current displacement sensor unit, and the bottom of the first shell is connected with the top of the intermediate connector;

a first mounting plate is arranged in the first shell, the periphery of the first mounting plate is connected with the first shell, and the first linear bearing is arranged in the middle of the first mounting plate;

the motion axis penetrates through the first linear bearing;

the first stop ring and the second stop ring are sequentially arranged on the side, facing the intermediate connector, of the first mounting plate and located on the motion axis from top to bottom; the first permanent magnet and the second permanent magnet are arranged between the first stop ring and the second stop ring;

the first electromagnetic coil and the second electromagnetic coil are sequentially and fixedly arranged between the first mounting plate and the intermediate connector in the first shell from top to bottom; and the second cushion block is arranged between the second electromagnetic coil and the intermediate connector;

the positive stiffness unit comprises a third stop ring, a third permanent magnet, a fourth permanent magnet, a fourth stop ring, a second shell, a third cushion block, a third electromagnetic coil, a fourth electromagnetic coil and a second linear bearing;

the top of the second shell is connected with the bottom of the intermediate connector, and the bottom of the second shell is connected with the bottom shell;

a second mounting plate is arranged in the second shell, the periphery of the second mounting plate is connected with the second shell, and the second linear bearing is arranged in the middle of the second mounting plate;

the motion axis penetrates through the second linear bearing;

the fourth stop ring and the third stop ring are sequentially arranged on the side, facing the intermediate connector, of the second mounting plate and located on the motion axis from top to bottom; the fourth permanent magnet and the third permanent magnet are arranged between the fourth stop ring and the third stop ring;

the fourth electromagnetic coil and the third electromagnetic coil are sequentially and fixedly arranged between the second mounting plate and the intermediate connector in the second shell from top to bottom; and the third cushion block is arranged between the third electromagnetic coil and the intermediate connector.

2. The quasi-zero stiffness absolute displacement sensor based on electromagnetic positive stiffness according to claim 1, wherein the magnetic pole directions of the first permanent magnet and the second permanent magnet are opposite.

3. The quasi-zero stiffness absolute displacement sensor based on electromagnetic positive stiffness according to claim 1, wherein a first cushion block is arranged between the first electromagnetic coil and the second electromagnetic coil.

4. The quasi-zero stiffness absolute displacement sensor based on electromagnetic positive stiffness according to claim 1, wherein the intermediate connector is of an annular structure, an interlayer is arranged in the middle of the intermediate connector, a through hole is formed in the middle of the interlayer, and the motion axis penetrates through the through hole.

5. The quasi-zero stiffness absolute displacement sensor based on electromagnetic positive stiffness according to claim 1, wherein the magnetic pole directions of the fourth permanent magnet and the third permanent magnet are opposite.

6. The quasi-zero stiffness absolute displacement sensor based on electromagnetic positive stiffness according to claim 1, wherein a fourth cushion block is arranged between the fourth electromagnetic coil and the third electromagnetic coil.

* * * * *